Dec. 17, 1946.  J. G. MAKI  2,412,643
HAY FEEDER
Filed April 17, 1945  5 Sheets-Sheet 1

Inventor
John G. Maki
By Bacon+Thomas
Attorneys

Dec. 17, 1946. J. G. MAKI 2,412,643
HAY FEEDER
Filed April 17, 1945 5 Sheets-Sheet 3

Inventor
John G. Maki

By Bacon + Thomas
Attorneys

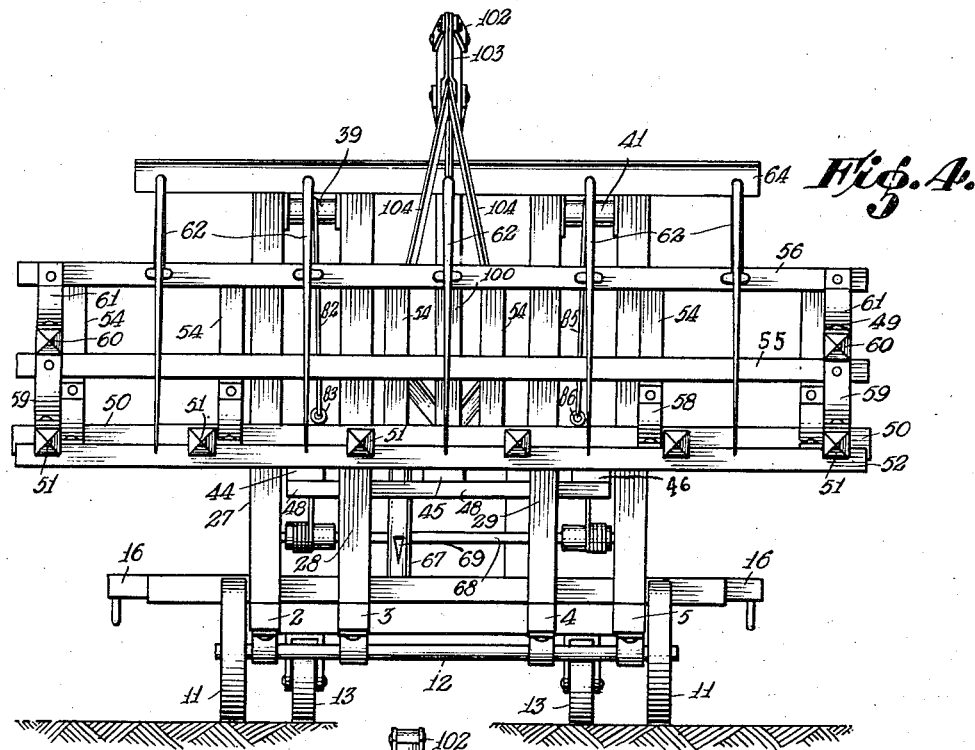

Dec. 17, 1946.  J. G. MAKI  2,412,643
HAY FEEDER
Filed April 17, 1945  5 Sheets-Sheet 5
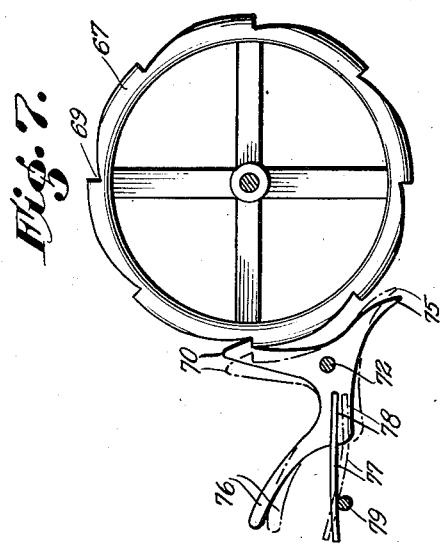
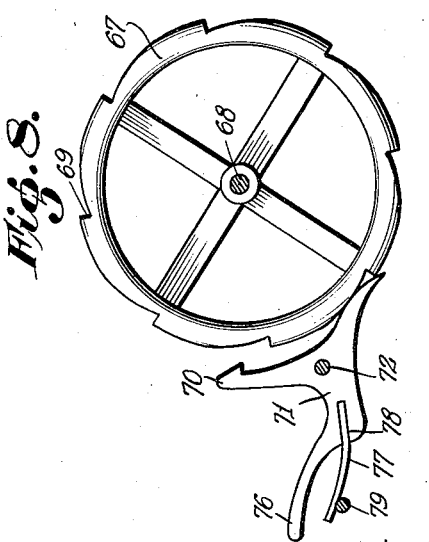
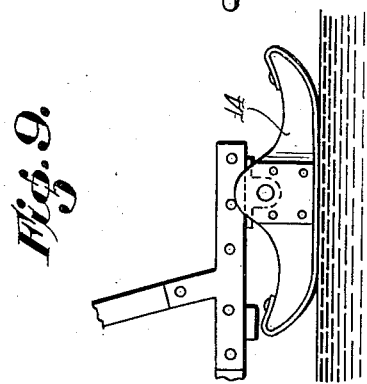
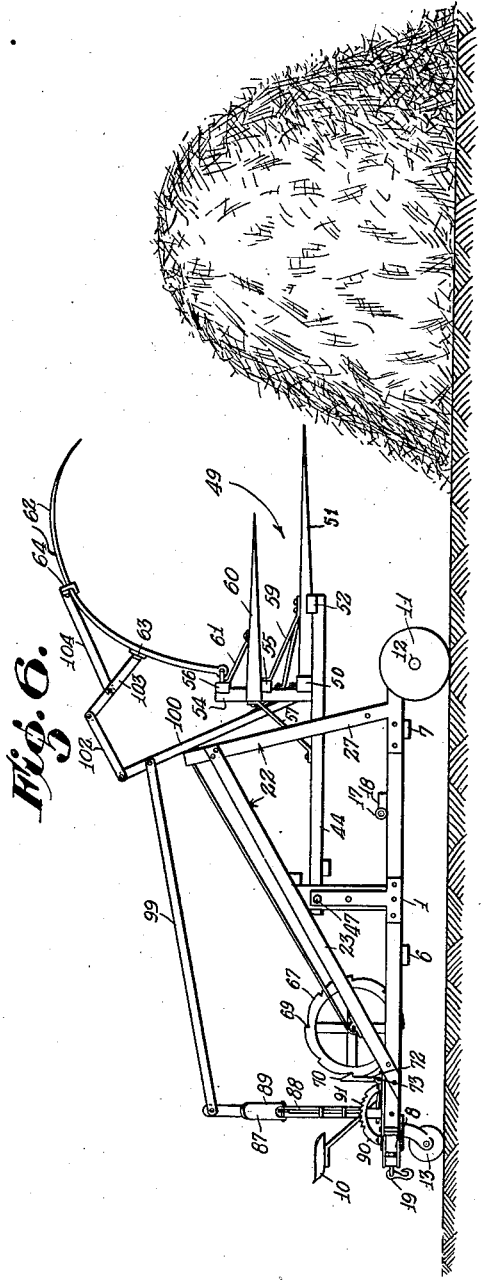
Inventor
John G. Maki
By Bacon + Thomas
Attorneys

UNITED STATES PATENT OFFICE 2,412,643

HAY FEEDER

John Gust Maki, Hanna, Wyo., assignor of one-half to A. S. Allen, Hanna, Wyo.

Application April 17, 1945, Serial No. 588,778

3 Claims. (Cl. 214—131)

The present invention relates to a hay feeder for animals, and more particularly to such a device designed to collect hay or like material from a stack in the field.

The primary object of the invention is accordingly to gather a quantity of hay from a stack or pile and deliver it to a point at which animals may be fed.

Another object of the invention is to provide a hay feeder for animals which is adjustable to a height such that it will readily conform to the height of any haystack from which it is desired to collect hay.

Still another object of the invention is to provide a hay feeding device which may be easily unloaded after the hay has been transported to the place of feeding.

A further object of the present invention is to provide a hay feeder designed to transport relatively large amounts of hay and in which spilling of the hay is kept at a minimum.

A still further object of the invention is to provide a hay feeder for animals which may be easily controlled by a single operator from a single position.

Still another object of the present invention is to provide a hay feeder for animals of sturdy and rugged construction but which will still be readily movable from place to place.

Other and further objects of the present invention will be readily apparent from the following detailed description taken in conjunction with the drawings, in which:

Figure 4 is a front elevational view illustrating the hay gathering end of the device;

Figure 5 is a rear elevational view particularly illustrating the arrangement of the operator's seat and the controls for the device;

Figure 6 is a side elevational view of the device showing the parts in position they assume when about to enter a stack of hay and remove a portion thereof;

Figure 7 is a detail view showing the position of the element which is associated with the means raising and lowering the hay-supporting platform wherein said means is locked in a fixed position.

Figure 8 is a similar view showing the element in a position wherein the means for raising and lowering the hay-supporting platform is subjected to a braking action after being released from the position shown in Fig. 7.

Figure 9 is a detailed view showing the substitution of a runner for a wheel to be used when the ground is covered with snow.

Figure 1:
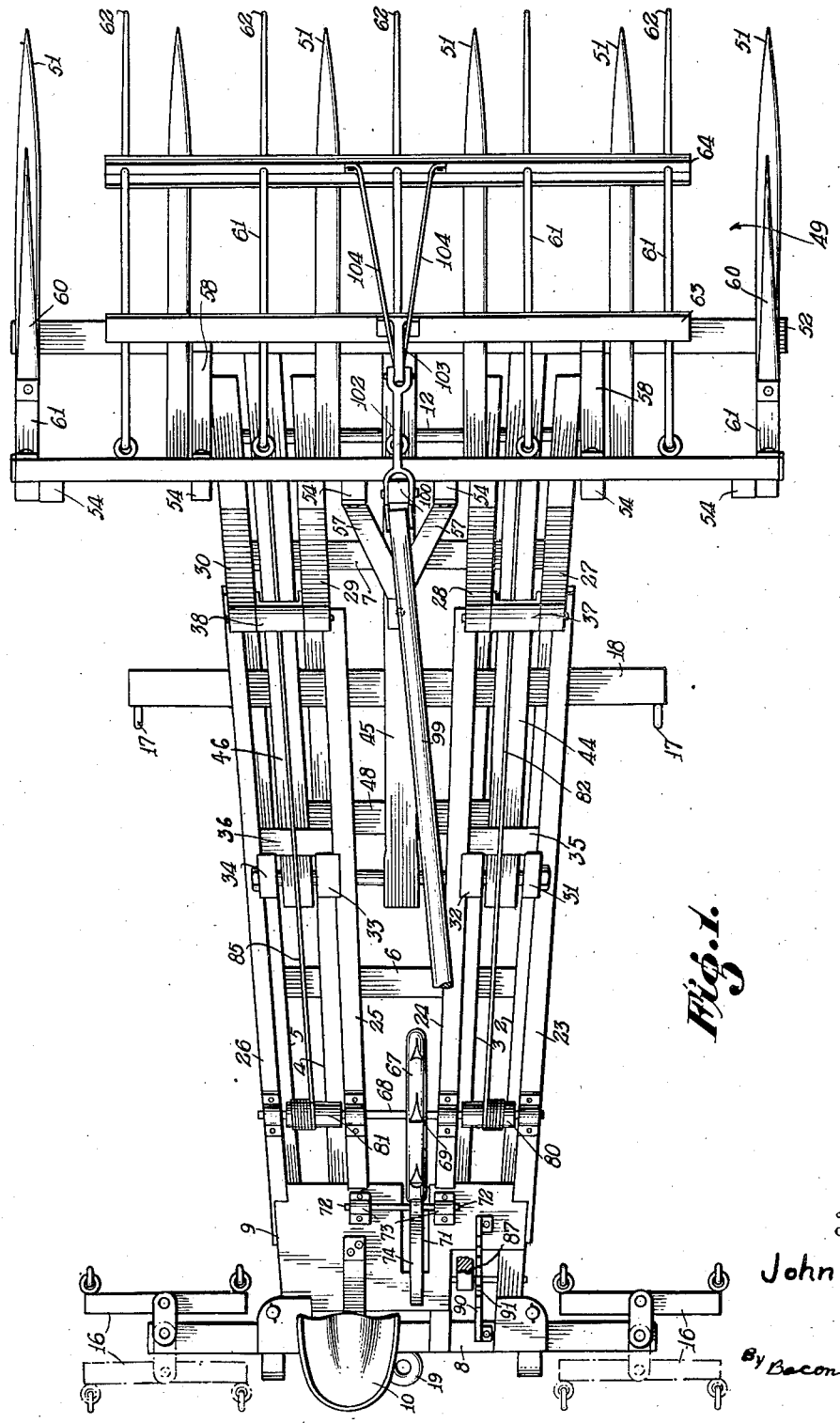
Figure 1 is a plan view of the device as a whole, but with a portion of the same broken away so that certain features of the invention will be more readily seen.

Referring now with greater particularity to the drawings, the numeral 1 generally denotes the supporting framework of the device. This framework comprises gradually converging beams 2, 3, 4 and 5 disposed in substantially parallel relationship with the ground in such a manner that the rear portion of the framework is considerably narrower than the front portion thereof. Cross beams 6 and 7 are rigidly secured to the beams 2, 3, 4 and 5 for the purpose of strengthening the structure. A cross bar 8 is rigidly secured by any suitable means to the extreme rearward ends of the beams 2, 3, 4 and 5 and extends a considerable distance to either side of the beams for a reason to be pointed out hereinafter. A platform 9 which may have a seat 10 mounted thereon is constructed on the rearward portion of the framework 1 for the convenience of the operator.

Figure 2:
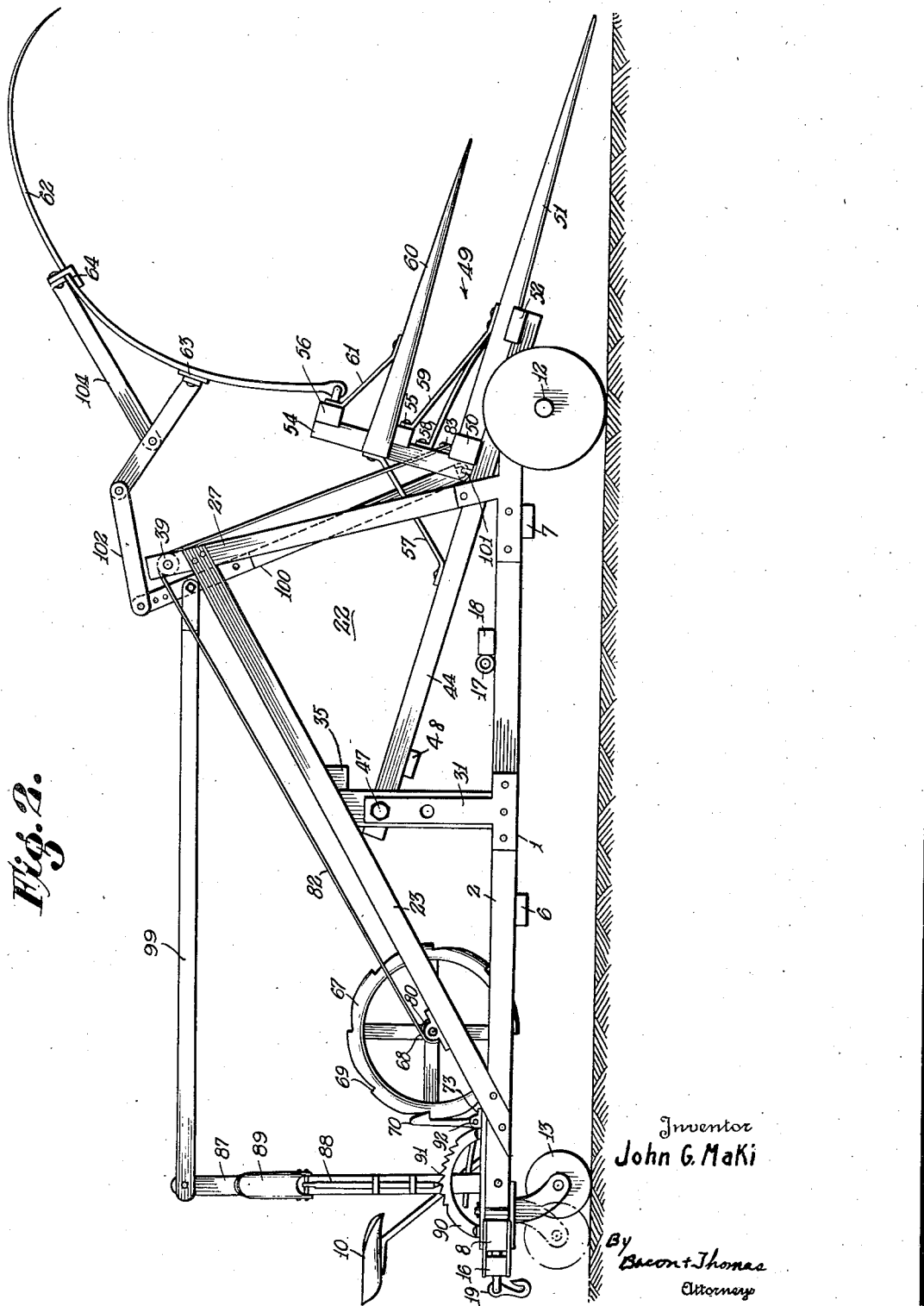
Figure 2 is a side elevational view of the device with the parts thereof in the position they assume during unloading.
Figure 3:
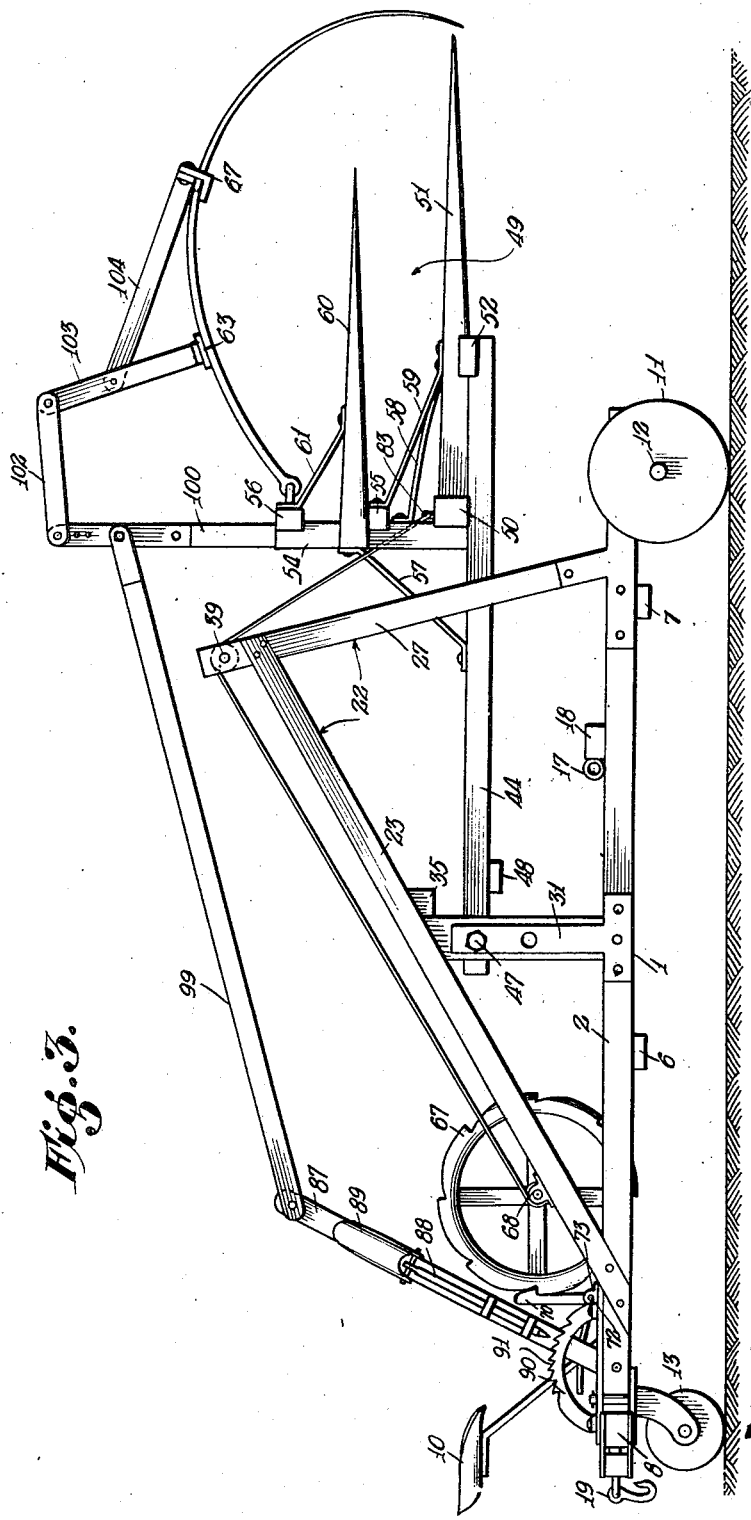
Figure 3 is a similar view illustrating the parts of the device in position for transporting a load of hay.

To provide for the movability of the structure front wheels 11 are journaled to an axle 12 rigidly secured by any suitable means to the framework 1 adjacent its forward end. Rear wheels 13 are independently mounted by suitable means adjacent the rearward end of the framework so as to be freely rotatable as is clearly shown in Fig. 2.

If the feeder is to be used when the ground is covered with snow runners 14 may be conveniently substituted for the wheels. For purposes of illustration the mounting of such a runner in place of one of the front wheels is shown in Figure 9 of the drawings. It is to be understood that the use hereinafter of the word "wheel" in the claims is to be inclusive of runners or any other suitable ground engaging means.

The device is preferably motivated by a team of horses (not shown) hitched to singletrees 16 rotatably mounted on the crossbar 8 and ring members 17 which cooperate therewith. Ring members 17 are mounted on a cross bar 18 rigidly secured to the framework 1.

It is understood that the mode of motivation is not an essential feature of the invention and that, if desired, other means may be used such as a tractor attached to a hitch 19. Also, if desired, the horses may be secured to the singletrees 16 when swung to a position shown in dotted lines in Figure 1 and the device pulled in that manner.

Arising from the framework 1 is a structure of triangular outline rigidly secured thereto and generally designated by the numeral 22. This structure comprises angularly disposed braces 23, 24, 25 and 26, the braces 23 and 26 being rigidly secured at their lower ends to the beams 2 and 5, respectively, and the braces 24 and 25 being rigidly secured at their lower ends by any suitable means to the platform 9. The upper ends of the braces 23, 24, 25 and 26 are rigidly secured to braces 27, 28, 29 and 30, respectively, at a point adjacent but spaced slightly from the upper ends of the last-named braces. The lower ends of the braces 27, 28, 29 and 30 are secured to members 2, 3, 4 and 5 at points adjacent their forward ends. Braces 27, 28, 29 and 30 are preferably inclined rearwardly at a slight angle to the vertical.

Upright members 31, 32, 33 and 34 are rigidly secured at their lower ends to the beams 2, 3, 4 and 5 and extend vertically to points of rigid attachment intermediate the ends of braces 23, 24, 25 and 26, respectively. Strengthening bars 35 and 36 are secured to braces 23 and 24, and 25 and 26, respectively. A strengthening strip 37 is secured across the top portion of braces 27 and 28 and strengthening strip 38 across the top portions of braces 29 and 30. A cylindrical member 39 is journaled between braces 27 and 28 and a cylindrical member 41 is journaled between braces 29 and 30.

A second framework including beams 44, 45 and 46 is pivotally mounted on a rod 47 extending through apertures in upright members 31, 32, 33 and 34 at points intermediate their ends, but preferably adjacent the upper ends thereof. The beams 44, 45 and 46 are rigidly interconnected adjacent their rearward ends by a strengthening cross bar 48.

Rigidly secured to the beams 44, 45, and 46 and preferably forming a straight line continuation thereof is the hay supporting platform generally designated by the numeral 49. The hay supporting platform 49 includes a cross strip 50 rigidly secured to the beams 44, 45 and 46 at points spaced from the forward ends thereof. To the cross strip 50 are rigidly secured a plurality of pointed stakes 51 disposed in uniformly spaced relationship. The stakes 51 are also rigidly secured to a second cross strip 52 which is in turn rigidly secured to the end portions of the beams 44, 45 and 46.

A rear wall may be provided for the hay supporting platform by rigidly securing vertical bars 54 to the cross strip 50 and horizontal bars 55 and 56 to the vertical bars 54. The rear wall may be conveniently strengthened by means of rigid bracing members 57, the lower ends of which are rigidly secured to a common point on the beam 45 and the upper ends of which are rigidly secured, one to each of the two central members of the vertical bars 54. Further strengthening of the rear wall of the hay-supporting platform may be accomplished by rigid members 58 secured at their one end to the vertical bars 54 and at their other end to the cross strip 52. Still further strengthening of the rear wall is provided by additional rigid members 59, one end of which is secured to the horizontal bar 55 adjacent its outer ends and the other ends of which are secured to the two outermost stakes 51.

Side walls for the hay-supporting platform are provided by means of pointed stakes 60 rigidly secured to the two outermost vertical bars 54 at points intermediate their ends, and extending outwardly in the same vertical plane and parallel to the two outermost stakes 51. The stakes 60 may be strengthened and positioned by means of rigid members 61 secured between the outermost ends of cross bar 56 and points on the stakes 60 spaced from the rear wall.

Hay retaining prongs 62 are pivotally fastened to the horizontal bar 56 and may be maintained as an integral assembly by cross strips 63 and 64.

The means for raising and lowering the framework including beams 44, 45 and 46 and the hay supporting platform 49 rigidly secured thereto comprises a ratchet wheel 67, the axle 68 of which is journaled on beams 23, 24, 25 and 26 at points adjacent their lower ends so that the wheel is within easy reach of the operator when seated. The periphery of the ratchet wheel 67 is provided with evenly spaced indentations 69 designed to cooperate with a locking pawl member 70 which forms an integral portion of an element 71, pivotally mounted on the platform 9, by means of an axle 72, journaled in bearing members 73, a slot 74 being provided in the platform 14 to receive the element 71. As shown clearly in Figures 7 and 8, the element 71 is also provided with a braking member 75 and a foot operating member 76.

The pawl 70 is normally urged into contact with the ratchet wheel 68 by means of a spring member 77, one end of which is received in a slot 78 in the member 71 and the other end of which bears against a fixed rod 79 rigidly secured to the framework 1 in a manner not shown in the drawings.

Surrounding the axle 68 and rigidly secured thereto are two cable drums 80 and 81. Around the drum 80 is wound one end of a cable or rope 82 which passes up over the cylindrical member 39 and is secured at its other end to a fastening 83 on the cross strip 50. Around the drum 81 is wound one end of a cable or rope 85, of a similar nature and length to the cable 82, which passes up over the cylindrical roller 41 and has its other end attached to a fastener 86 also on the cross bar 50.

The independent raising and lowering of the prongs 62 is accomplished by means of a hand lever 87. The position of the lever 87 is maintained by the cooperation of a latch member 88 having a handle 89 with a semi-circular rack 90 on the peripheral edge of which are a number of teeth 91 similar to ratchet teeth. To the upper end of the lever arm 87 is pivotally attached one end of a linkage arm 99, the other end of which is pivotally secured to a second lever arm 100 intermediate its ends. The lower end of the lever arm 100 is pivotally mounted by means of a fastening 101 on the beam 45 at a point adjacent its connection with the cross strip 50.

To the upper end of the lever arm 100 is pivotally attached one end of a link member 102, the other end of which is pivotally secured to an arm 103 which is in turn rigidly secured to the cross bar 63 by welding or other suitable means. Strengthening and better weight distribution may be conveniently achieved by rigidly securing one end of support members 104 to a common point on the arm 103 intermediate its ends and the other ends to the cross bar 64 at spaced points.

The operation of the hay feeding machine will be readily apparent from the foregoing detailed description. When the device approaches a haystack as illustrated in Fig. 6, the hay retaining platform is adjusted to the proper height by turning the ratchet wheel 67 and the hay retaining prongs 62 are placed in a raised position by drawing back the hand lever 87. The platform and prongs are maintained in the desired position by means of the locking pawl 70 and latch 88, respectively. The stakes 51 are then thrust into the stack or pile of hay and the retaining prongs allowed to drop by releasing the latch member 88 by pressure on the handle 89. The hay feeder is then backed away from the stack, and the hay retained on the platform may be transported to any desired point where animals are to be fed.

To release the hay, the framework including beams 44, 45, and 46 and platform 53 rigidly secured thereto are allowed to drop to a point where the ends of stakes 51 are near the surface of the ground by means of pressure on the foot pedal 76. This separates the locking pawl 70 from the indentations 69 on ratchet wheel 67 and upon the continuance of pressure the braking member 75 engages the ratchet wheel and prevents the descent from becoming so precipitous as to damage the mechanism. There is, of course, as shown in Figure 7 by means of the dotted lines, an intermediate position at which neither the pawl member nor braking member engages the ratchet wheel and it is free to turn unhindered.

After the platform has been lowered, the hay may be released by again raising the prongs 62 as described above and backing off the device. If necessary, external means may be employed to remove all of the hay from the platform.

It is to be understood, of course, that the invention is not limited to the precise and exact details of the device described above in considerable particularity for the purpose of illustration, and that these details may be somewhat changed and modified without departing from the essence and scope of the invention as set forth in the following claims.

I claim:

1. A vehicle adapted for use as a hay feeder for animals comprising: a wheel supported framework; a second framework pivotally connected to said first named framework; a platform for supporting hay rigidly secured to said second named framework adapted to be thrust into a haystack; hay retaining prongs pivotally associated with said platform; means for raising and lowering said second named framework, including a ratchet wheel and an element both mounted on said first named framework, said element comprising a locking pawl member and a brake member selectively engageable with said ratchet wheel to lock said ratchet wheel in one position of said element and exert a braking action on said ratchet wheel in another position of said element; and means for raising and lowering said prongs.

2. A vehicle adapted for use as a hay feeder for animals comprising; a wheel supported framework; a triangular structure including a plurality of braces arising from said framework and rigidly secured thereto; a cylindrical member journaled on said triangular structure adjacent its apex; a plurality of upright members rigidly secured to said framework; a second framework pivotally secured to said upright members; a hay supporting platform adapted to be thrust into a haystack rigidly secured to said second named framework and forming a straight line continuation thereof; and means for raising and lowering said hay supporting platform including a cable one end of which is secured to said platform and the other end of which is wound on a rotatable drum journaled on said triangular structure adjacent its rearward end, said cable passing over said cylindrical member.

3. A vehicle adapted for use as a hay feeder for animals comprising: a wheel supported framework; a plurality of upright members rigidly secured to said framework; a second framework pivotally secured to said upright members above said first-named framework; a hay supporting platform adapted to be thrust into a hay stack rigidly secured to said second-named framework so as to form a straight line continuation thereof; and means moving said second framework and hay supporting platform rigidly secured thereto from a position wherein it may be readily thrust into a hay stack to a position wherein said second-named framework and hay supporting platform rigidly secured thereto extend outwardly and downwardly to a point below said first-named framework so that hay is readily removable from said platform.

JOHN GUST MAKI.